United States Patent [19]

Yamada

[11] 3,973,891
[45] Aug. 10, 1976

[54] INJECTION MOLDING APPARATUS HAVING PERMANENT MOLD CONVEYING PATH

[75] Inventor: Sigemitu Yamada, Hitachi, Japan

[73] Assignee: Hitachi, Ltd., Japan

[22] Filed: Dec. 2, 1974

[21] Appl. No.: 528,928

[30] Foreign Application Priority Data
Dec. 5, 1973   Japan.............................. 48-135361

[52] U.S. Cl. ............................... 425/246; 425/451; 425/DIG. 201
[51] Int. Cl.² ........................................... B29F 1/00
[58] Field of Search ............ 425/246, 451, DIG. 201

[56] References Cited
UNITED STATES PATENTS

| | | | |
|---|---|---|---|
| 2,892,214 | 6/1959 | McCarthy | 425/246 X |
| 3,006,032 | 10/1961 | Baker et al. | 425/246 X |
| 3,078,506 | 2/1963 | Coughey | 425/DIG. 201 |
| 3,233,285 | 2/1966 | Ludwig | 425/246 X |
| 3,302,243 | 2/1967 | Ludwig | 425/246 X |
| 3,464,091 | 9/1969 | Bielfeldt | 425/246 |

*Primary Examiner*—Robert L. Spicer, Jr.
*Attorney, Agent, or Firm*—Craig & Antonelli

[57] ABSTRACT

An injection molding apparatus including an injection machine, a mold conveying path following a rectangular pattern and starting from the injection portion of the injection machine and terminating thereat, a molded product removing means located adjacent to the terminal of the mold conveying path, a mold-direction turning means for a permanent mold, which is located at the corners of the path, and a drive means for moving permanent molds on the conveying path. In this apparatus, the permanent molds after injection are cooled during their travel on the conveying path. This apparatus is intended to give a full play to the function of an injection machine and saves the molding time of products to a great extent.

2 Claims, 11 Drawing Figures

INJECTION MOLDING APPARATUS HAVING PERMANENT MOLD CONVEYING PATH

BACKGROUND OF THE INVENTION

This invention relates to an injection molding apparatus, and more particularly to an injection molding apparatus which is provided with an injection molding machine and a permanent mold conveying path located close to the injection molding machine.

The molding operation of plastic products is classified into an injection cycle and a cooling cycle. The injection cycle is in general completed within as short as 10 seconds, while the cooling cycle takes more than 50 to 60 seconds. Accordingly, it is preferable that there be prepared a plurality of permanent molds, so that only injection cycle is attended upon by an injection machine, while the cooling cycle is carried out outside the injection machine, in an attempt to produce a great number of products within a limited period of time. To meet this end, there has been proposed a rotary type injecting machine, although this type of machine suffers from the following shortcomings. In other words, (i) this type of machine requires that a plurality of permanent molds be placed on a circular table, resulting in an increase in size of the aforesaid table, which in turn leads to an increase in the size of the injection apparatus; (ii) because of the failure to apply a sufficient tightening force to a permanent mold, there may not be achieved high-precision products; (iii) there is required an injection machine which is exclusively used for this type of injection, so that there results a complicated construction of an injection machine, and thus the machine is costly; (iv) Because of the failure to provide a sufficiently long stroke for a permanent mold, upon opening of the mold, there may not be achieved simple and positive opening and closing operations of permanent molds; and (v) For the above reason, there may not be achieved a simple device for opening and closing a permanent mold.

SUMMARY OF THE INVENTION

It is accordingly an object of the present invention to provide an injection molding apparatus which avoids the aforesaid shortcomings experienced with the prior art apparatus and which utilizes a general type of injection machines and is provided with an improved type of a permanent mold conveying path, thereby achieving a yield several times as high as that obtained by the general type of injection machines.

According to one aspect of the present invention, a mold tightening metal piece is driven into a permanent mold, simultaneously with gate sealing but immediately after injection, after which the mold-tightening force applied by the injection machine is released. As a result, even if the permanent mold is taken out from an injection station, there remains a high mold-tightening force in the permanent mold, thus affording no adverse influence on molded products.

According to another aspect of the present invention, an injection station and a molded product removing station are located separately, so that there may be avoided time consuming operation of cooling a mold in the injecting station, with the mold being maintained in a tightened condition.

According to a further aspect of the present invention, the injection molding machine may exclusively attend upon an injection cycle which does not include a cooling cycle, so that there results considerable improvements in the usage data of an injection machine, which usage data is 5 to 6 times as high as that in the conventional machine.

According to a still further aspect of the present invention, although the number of permanent molds are substantially the same as that in a rotary type injection machine, the number of the permanent molds may be reduced by applying forced cooling and forced heating thereto.

According to a yet further aspect of the present invention, permanent-mold-direction turning units (turn tables) are provided, thereby minimizing the distance of the permanent molding being transported, and a molded product removing station is located at the end of the permanent mold conveying path.

According to a further aspect of the present invention, the time required for the permanent mold conveying operation may be extended so as to extend the cooling time, with the resulting reduction in the idle time of permanent molds.

According to a further aspect of the present invention, a mold-conveying path of a rectangular pattern is used, and in addition a plurality of permanent molds may be subjected to free flowing on the path, thereby enabling permanent molds having different types of cavities to be fed to the same conveying line at a time.

According to the present invention, there is provided an injection apparatus which includes: an injection machine; a plurality of permanent molds adapted to be fed in or out from an injection station of the injection machine and opened or closed by means of a mold-tightening mechanism; a conveying path of a rectangular pattern, which starts from the injection station of the injection machine and terminates at the aforesaid injection station; mold-direction turning means adapted to turn the direction of a permanent mold at the corners of the conveying path; and means for moving the permanent molds on the conveying path.

DETAILED DESCRIPTION OF THE PREFERRED EMBODIMENTS

Overall description will now be given of the apparatus according to the present invention in conjunction with FIG. 1. Shown at 1 is an injection molding machine of a general type which is provided with a heating cylinder 1A adapted to contain a resin to be injected therefrom, a fixing platen 1B and a movable platen 1C for tightening a permanent mold, guide rods 1D adapted to guide the movable platen 1C, a ram 1E coupled to the movable platen 1C, and a cylinder means 1F for driving the ram 1E. In this injection machine 1, a permanent mold is tightened at an injection station 2 confined between the fixing platen 1B and the movable platen 1C, while molten resin is injected from the heating cylinder 1A into a mold.

According to the injection apparatus of the present invention, there is provided a conveying path 3 for taking out from the injection station 2 a permanent mold, in which a resin has been injected, and for conveying the permanent molds thereon for cooling same for a given period of time. The conveying path 3 starts with the injection station 2 and terminates thereat to provide a closed loop path, while surrounding the cylinder means 1F therewith. In addition, the conveying path 3 is arranged to form a rectangular pattern to minimize the area occupied by the conveying paths together with a linear conveying path 4 running through the injection station 2, linear conveying paths 5, 7 located at a right angle thereof and a linear conveying path 6 running in parallel with the aforesaid conveying path 4. At the respective corners connecting those conveying paths together, there are mold-direction turning means 8, 9, 10 and 11 which are adapted to turn the direction of a permanent mold 13 (In the figure, only one mold is shown.), which are being transported on the respective conveying paths, through an angle of 90° for sending same onto the subsequent path. In an example shown, the permanent mold 13 is being transported in the direction shown by an arrow, i.e., in the counterclockwise direction. Located on the mold conveying path 7 is a product taking-out or removing means 12 adapted to take out a molded product within the permanent mold by opening same therefrom. In this manner, since the injection station including a mold tightening portion, and the product removing station are located separately, and in addition those stations are connected by way of the conveying path 3, the cooling time required for cooling permanent molds may be extended to a suitable period of time for effectively cooling the molds. In addition, the time from the completion of injection until the subsequent injection may be shortened to a considerable extent by minimizing the length of the conveying paths leading from the product removing station back to the injection station. The aforesaid time is used for heating a cavity within a permanent mold and thus a quite a short time suffices to be allotted to this end.

Figures 6, 7:
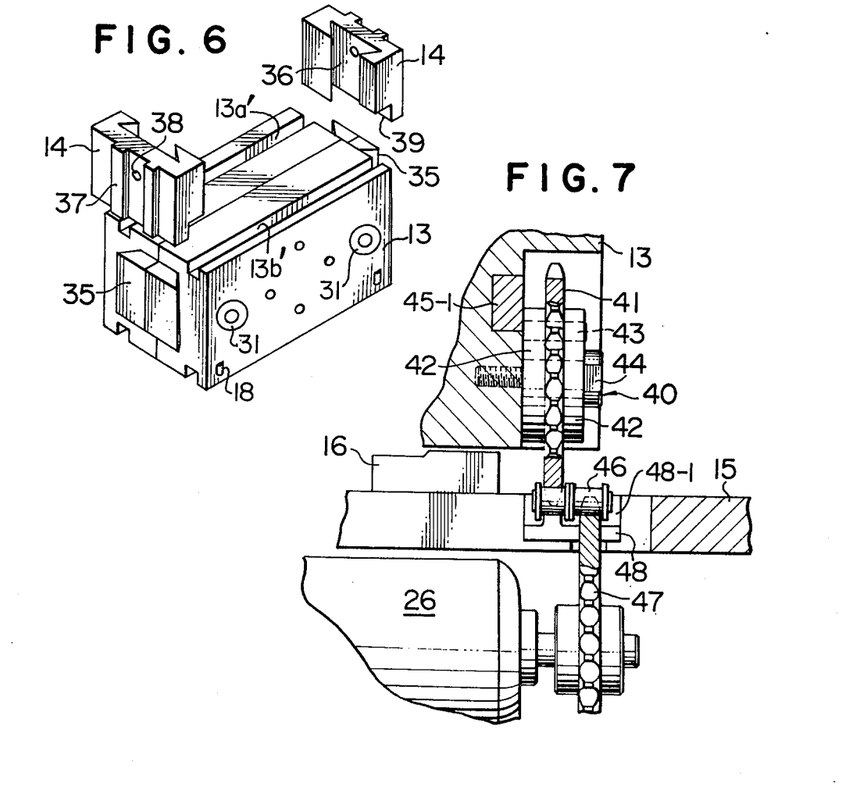
FIG. 6 is a perspective view showing a mold and a mold-tightening metal piece.
FIG. 7 is a view showing a power transmitting mechanism for conveying molds.

After mold tightening, injection and injection gate sealing at the injection station 2, the permanent mold 13 is taken out from the injection station 2 and conveyed on the conveying path for cooling. However, a mold tightening metal piece (a wedge) 14 is used for maintaining the permanent mold in a tightening condition even after the removal of the mold 13 from the injection station, as shown in FIG. 6. The mold tightening metal piece 14 is driven into the permanent mold 13 at the time of injection. Description will be given in more detail of the mold tightening metal piece, hereinafter. When the permanent mold 13 reaches the molded-product removing means 12, then the mold tightening metal piece 14 is released from engagement with the mold. Those are the outlines of the injection molding apparatus according to the present invention. Following is detailed description of the respective portions of the apparatus.

Figure 2:
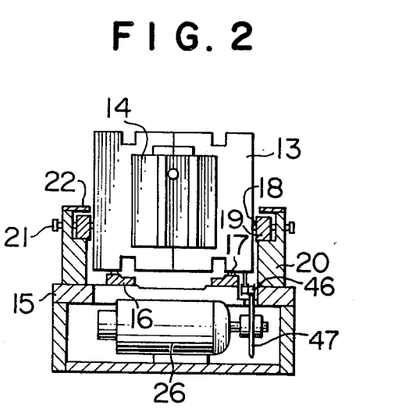
FIG. 2 is a cross-sectional view of the mold conveying path.

FIG. 2 shows a cross-sectional view of the conveying path, on which a permanent mold 13 is borne. In this figure, shown at 15 is a base plate, on which two rails 16 are rigidly mounted. Rollers 17 built in the bottom portion of the permanent mold 13 roll on the rails 16. Rigidly mounted on the opposite side portions of the base plate 15 are guide plates 19 which are so positioned as to contact rollers 18 built in the opposite side surfaces of the permanent mold 13, and blocks 20 which support the guide plates 19 thereon. The positions of the guide plates 19 may be adjusted by means of adjusting bolts 21. Covers 22 are attached to the top of the blocks 20, respectively.

Figure 4:
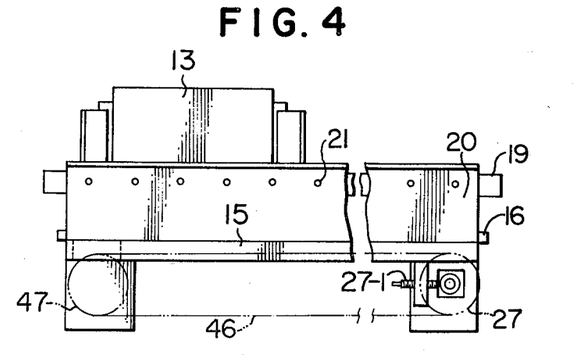
FIG. 4 is a side view showing the linear portions of the mold-conveying path.

In order to convey the mold 13, there is provided an electrical motor 26 mounted under the base plate 15, a sprocket 47 mounted on the rotary shaft of the motor 26 and a roller chain 46. As shown in FIG. 4, the sprocket 47 is located at one end of the base plate 15 while a tension sprocket 27 is provided at the other end of the base plate 15. The sprocket 27 is supported slidably in the horizontal direction and can be adjusted by a screw 27-1. The roller chain 46 is looped about the sprockets 47, 27. The upper horizontal portion of the chain 46 travels in a groove formed on the upper surface of the base plate 15.

As shown in FIG. 7, the roller chain 46 is of a double row type. One row of the roller chain 46 engages with the sprocket 47 rotated by the electric motor 26 so that the roller chain 46 may be moved along the recess 48-1, being guided by a chain guide 48 mounted in the recess 48-1. The other row of the roller chain 46 is engaged with a clutch 40 supported by the mold 13. The clutch 40 consists of two ratchets 42 which sandwich a sprocket 41 therebetween, with the directions of ratchets being opposed to each other, and a knock pin 43 for integrally coupling those ratchets and sprocket together. This clutch 40 is mounted on the permanent mold 13 rotatably by a pin 44. The teeth formed on the outer circumference of the sprocket 41 mesh with the left row of the roller chain 46 so that when the sprocket 41 is restricted in rotation, the mold 13 may move with the roller chain 46 and when the sprocket 41 is free in rotation, the mold 13 may not move while the sprocket 41 rotating.

Figure 8:
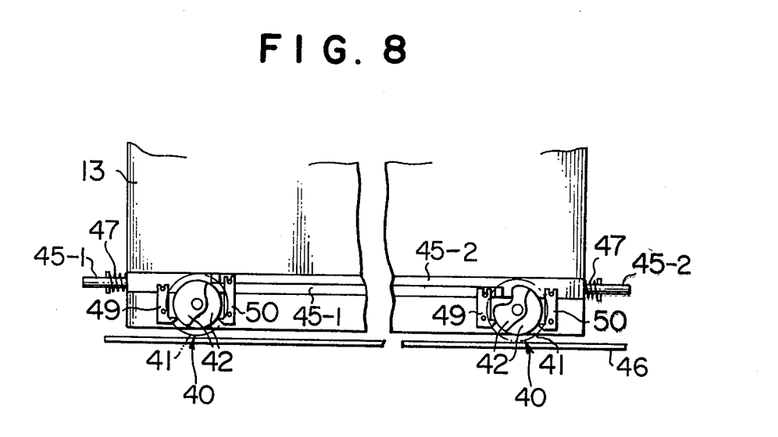
FIG. 8 is a view showing a clutch housed in a mold.

FIG. 8 shows the side view of a lower portion of the mold 13. A pair of the clutches 40 are provided adjacent to the leading and trailing ends of the mold 13. Adjacent to each of the clutches 40, there are provided swingable ratchet pawls 49 and 50 on both sides of the clutch. One pawl 49 meshes with one of the ratchets 42 while the other pawl 50 meshes with the other ratchet so that the clutch 40 may be locked against both clockwise and counterclockwise rotations. The pawl 49 serves to lock the sprocket 41 against the clockwise rotation and the other pawl 50 serves to lock the sprocket against the counter-clockwise rotation. The upper ends of the pawls 49 are connected to a detecting bar 45-1 which is slidably supported in the mold 13 and projects from the lefthand side of the mold 13 to a suitable length. The detecting bar 45-1 is biased by a coil spring 47 to a position where the pawl 49 engages with the ratchet 42. When the detecting bar 45-1 is pushed in the right direction against the coil spring, the detecting bar 45-1 moves the pawls 49 out of engagement with the ratchet 42 so that the ratchet 42 and the sprocket 41 may get free in clockwise rotation. Similarly, a detecting bar 45-2 is provided, which is connected to the upper ends of the pawls 50 and projects from the righthand side of the mold 13. When the roller chain 46 is travelling in the left direction, it tends to rotate the sprockets 41 in the clockwise direction. However the sprockets 41 are locked against the clockwise rotation by the pawls 49 and the ratchets 42, the sprockets 41 are moved with the mold 13 in the left direction by the roller chain 46. When the detecting bar 45-1 which projects from the leading side or lefthand side of the mold 13 is pushed by a suitable stopper (not shown), the pawls 49 get out of engagement with the ratchets 42 and allow the sprockets 41 to freely rotate. Due to the idle rotation of the sprockets 41 the mold 13 stops travelling with the roller chain 46 without any shock or trouble. In a similar manner, the travelling of the mold 13 in the right direction is operated by the detecting bar 45-2. The aforesaid arrangement for conveying the mold 13 along the conveying path is particularly useful for moving the mold 13 back and forth and stopping the same, but this is not essential in the practice of the present invention.

Figure 3:
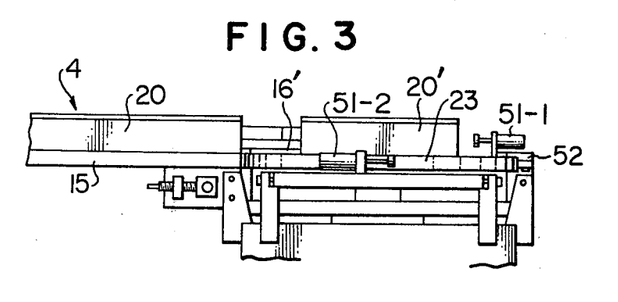
FIG. 3 is a side view showing a mold-direction turning means.
Figure 9:
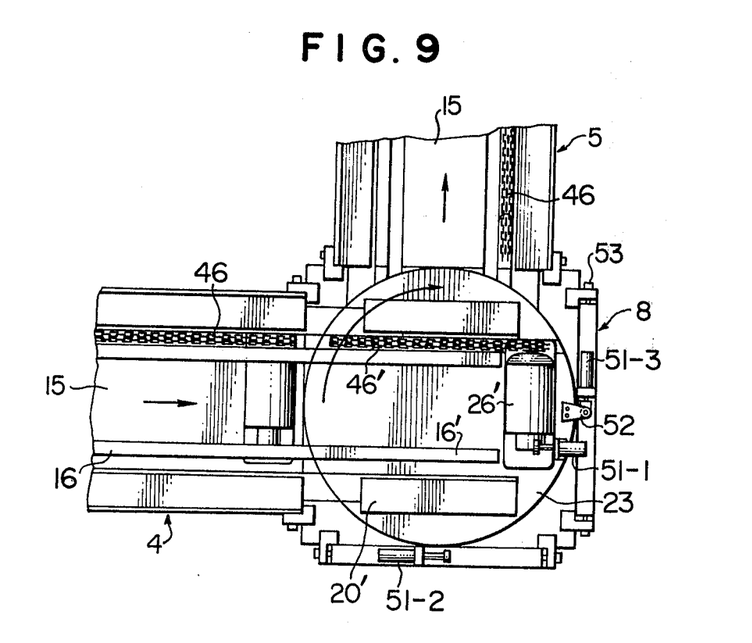
FIG. 9 is a top view of the mold-direction turning means.

Referring to FIGS. 3 and 9, the mold-direction turning means 8, 9, 10 and 11 are explained hereinfter. Since all the means 8, 9, 10 and 11 are same in construction, one means 8 is explained in detail. Shown at 23 is a turn table which is flush with the base plate 15 and adapted to be turned through an angle of 90° by a drive means (not shown). On the turn table 23, there are provided two rails 16', two blocks 20' supporting guide plates and a roller chain 46' driven by a motor 26', in a similar manner as disclosed in the conveying path. A shock absorber 51-1 is mounted at the end of a mold travelling path defined between two blocks 20'. The shock absorber 51-1 serves to stop smoothly the mold brought onto the turn table 23. A stopper 52 is mounted at a periphery portion of the turn table 23 while a pair of shock absorbers 51-2 and 51-3 are provided stationarily adjacent to the turn table 23 and spaced apart from each other at an angle of 90° around the turn table 23. When the turn table 23 is turned in the clockwise direction, the stopper 52 impinges on the shock absorber 51-2 while when the turn table 23 is turned in the counterclockwise direction, the stopper 52 impinges on the shock absorbers 51-3 so that shocks may be absorbed thus permitting the smooth turning for turn table 23. The positions of the shock absorbers 51-2 and 51-3 are adjustable by means of bolts 53.

Figure 5:
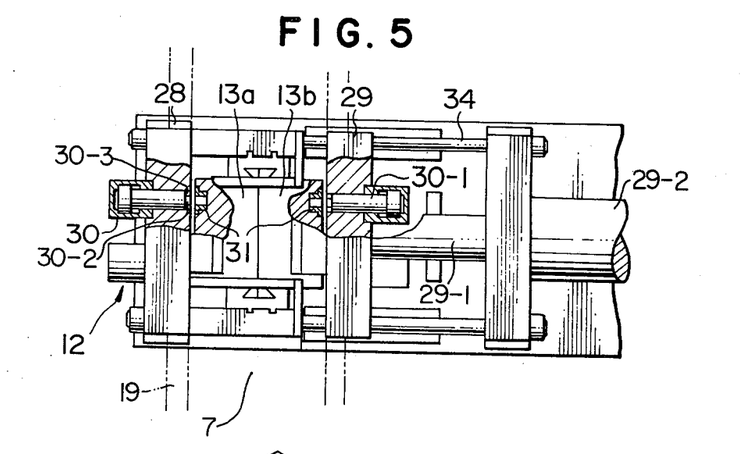
FIG. 5 is a partial cross-sectional top view of the removing station of a molded product.
Figure 10:
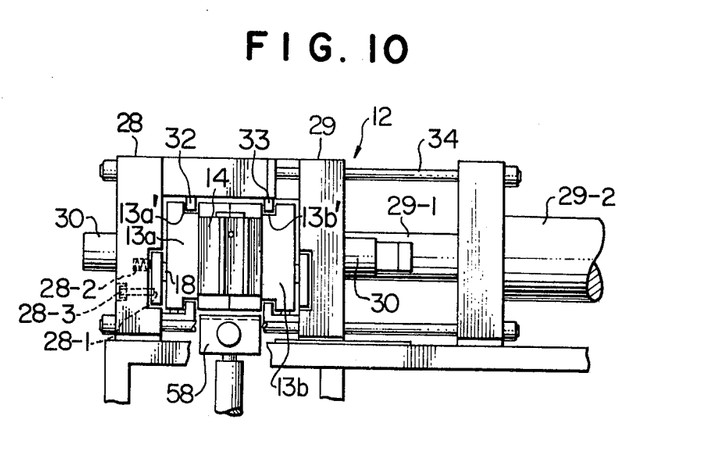
FIG. 10 is a side view of the removing station of a molded product.

FIGS. 5 and 10 show the molded product removing means 12 which is installed in the middle of the conveying path 7. A fixing platen 28 is located in alignment with the guide plate 19 of the conveying path 7. A movable platen 29 is slidably mounted on tie-bars 34 and connected to a piston rod 29-1 of a cylinder 29-2 so as to be moved. The fixing platen 28 has clamping pawls 32 which engage with recessed portion 13a' of the mold half 13a. The movable platen 29 has clamping pawls 33 which engage with recessed portion 13b' of the mold half 13b. In addition, the fixing platen 28 and the movable platen 29 have cylinders 30 and cylinder rods 30-1 which have guide pins 30-2 and tip shoulder portions 30-3 at an end. The mold 13 is provided at the opposite sides with bushings 31 in alignment with the cylinder rods 30-1 so that the guide pins 30-2 are inserted into the bushings 31 to center the mold with respect to its advancing direction. In addition, the cylinder rods 30-1 serve to urge the mold halves 13a and 13b in the horizontal direction to contact the inner side-surfaces of the recessed portions 13a' and 13b' against the clamping pawls 32 and 33 so that the mold halves 13a and 13b are clamped respectively to the fixing platen 28 and movable platen 29. As shown in FIG. 10, the fixing platen 28 further has a guide plate 28-1 for guiding the mold 13. The guide plate 28-1 is supported for horizontal movement of a certain distance by bolts 28-3 which are mounted slidably through the platen 28 and is biased by coil springs 28-2 inwardly. A similar guide plate is also provided on the movable platen 29. When the movable platen 29 moves the mold 13 to clamp it strongly, the guide plates move rearwardly against the coil springs to prevent the rollers of the mold 13 from breaking. In order to remove the mold tightening metal piece 14 from the mold 13, there are provided pushing devices 58 between the platens 28 and 29.

In operation of the molded product removing means 12, at first, a mold 13 is conveyed and stopped between the fixing and movable platens 28, 29. Then the cylinders 30 operate to move the cylinder rods 30-1 and to insert the guide pins 30-2 into the bushings 31 of the mold 13, thus centering the permanent mold with respect to its advancing operation. Then the cylinder 29-2 operates to move the movable platen 29 to the mold 13 to clamp it strongly and the pushing device 58 removes the metal piece 14 upwardly from the mold 13. Thereafter, the movable platen 29 is moved rearwardly to open the mold 13 and a molded product is removed from the mold. Then the mold 13 is returned to its initial condition and the metal piece 14 is mounted to the mold 13.

Figure 11:
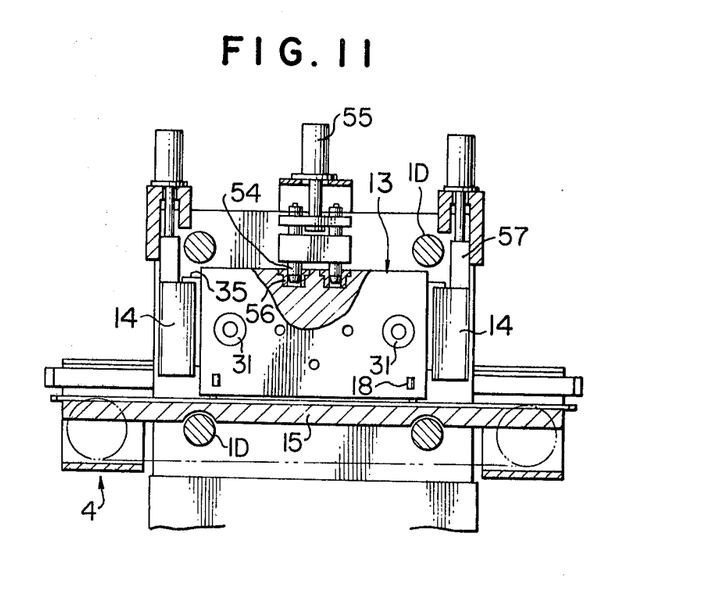
FIG. 11 is a sectional view of an injection molding station.

FIG. 11 shows the injection molding station in section. The base plate 15 of the conveying path 4 is located above the lower guide rods 1D of the injection molding machine 1 (refer to FIG. 1). The mold 13 is conveyed on the base plate 15 horizontally through the space between the upper and lower guide rods 1D. Centering pins or guide pins 54 are supported by a cylinder device 55 so as to move up and down and adapted to be inserted into bushings 56 mounted on the mold 13. A pair of pushing devices 57 are provided so as to push the metal piece 14 to tighten the mold 13 firmly.

FIG. 6 shows an embodiment of the mold 13 and the mold tightening metal piece 14. As is clear from this figure, wedge type projections are provided on the side surfaces of the permanent molds 13a and 13b. On the other hand, the mold tightening metal piece 14 is formed with grooves 36 receiving or fitting on the wedge type projections 35, so that force to tighten the mold 13 together is created by pressing the mold tightening metal piece 14 so as to fit on the projections 35. The mold tightening metal piece 14 is provided with guiding projections 37 adapted to guide the metal piece 14 sliding, when pressed in and withdrawn from the permanent mold 13, a retaining hole 38 adapted to positively hold the mold tightening metal piece in its withdrawn condition, and a relief portiion 39 which is adapted to shorten a withdrawing stroke of the mold tightening metal piece 14, when brought to a withdrawn condition and to leave some restraining force in the permanent mold, when opened, with part of the mold tightening metal piece 14 remaining in not fully withdrawn condition. Accordingly, when resorted to the aforesaid arrangement, the mold tightening metal piece 14 will not completely be freed.

Now, the overall operations of the injection apparatus according to the present invention will be given in conjunction with the accompanying drawings. A plurality of permanent molds of the number which is estimated based on the injection time, cooling time and yield of products, are so designed as to travel on the mold conveying path, while confirming the condition in the subsequent process. Thus, when the subsequent step has not been completed, then the permanent molds are designed so as to freely flow to the position close to the subsequent process.

In general, the number of the permanent molds is given by the following formula;

$$\text{Number of permanent molds} = \frac{\text{cooling time + product removing at time + stand-by time + time required for injection + conveying time}}{\text{the longest processing time}}$$

The term "stand-by time" as used herein represents the time from the removal of a mold until the mold is delivered to the injection station, and "time required for injection" represents the time (injection time + gate sealing time + time required for taking permanent mold from the injection station + allowance). "The longest processing time" represents the processing time of the device which requires the longest time in the all devices constituting the inventive apparatus except conveying time.

Now, description is given of the operation of the injection apparatus by referring to one of permanent molds. The moment the permanent mold 13 is stopped at the injection station 2, then the two guide pins 54 provided in the top portion of the injection station are inserted into the bushings 56 provided in the top surface of the permanent mold, thereby confirming the centering of the permanent mold. Then, the movable platen of the injection machine which has retroceded a distance of 2 to 3 mm advances so as to tighten the permanent mold. Simultaneously therewith, the injection machine 1 brings its nozzle in contact with the mold to start the injection of plasticized material into the permanent mold. During this mold-tightening and injecting operations, the mold tightening metal piece 14 is press-fitted in a convex groove 35 of a wedge-like shape by the pushing devices 57. Upon completion of injection and gate sealing, then mold tightening condition is released and the guide pin is lifted up, while the permanent mold 13 is moved from the injection station 2 to the mold-direction turning means 8. In this mold-direction turning means 8, the permanent mold 13 is turned through an angle of 90° for being transported to the linear mold-conveying path 5. The direction of the direction turning means is such as to minimize the overall length of the conveying path and to facilitate the opening of the product removing means or taking-out means. Likewise, the permanent mold is conveyed from the mold-direction turning means 9 by way of linear mold-conveying path 6 and the mold-direction turning means 10 onto the linear mold conveying path 7. The subsequent device placed in the conveying direction of the permanent mold is ready for receiving same, then the permanent mold is rapidly transported downstream of the product removing means 12, while being cooled. If the cooling is not sufficient, then the permanent mold is stopped on the mold-conveying path 7, and cooled thereon. The permanent mold 13 which has been cooled to satisfaction, is then transported onto product removing means 12, followed in turn by the locating operation by means of cylinder 30 and bushing 31, clamping, removal of the mold tightening metal piece 14, while insuring the retaining condition of the mold, opening of the permanent mold, removal of a product, then mold tightening, mounting of mold tightening metal piece 14, and releasing operation of clamps. The permanent mold, immediately after the removal of a product therefrom, is then transported by way of the linear mold-conveying path 7 to the mold-direction turning means 11. In the aforesaid means 11, the temperature in the permanent mold 13 is adjusted, and the mold is ready for an instruction to permit the transportation of the permanent mold 13 into the injection station. In either of the aforesaid means, if there is a permanent mold 13 in the subsequent process or in the case of abnormal condition, the aforesaid means are so designed as to stop the permanent molds from entering the subsequent process, or to re-start the transportation of the permanent molds, when the preceding process has been restored to the normal condition.

Figure 1:
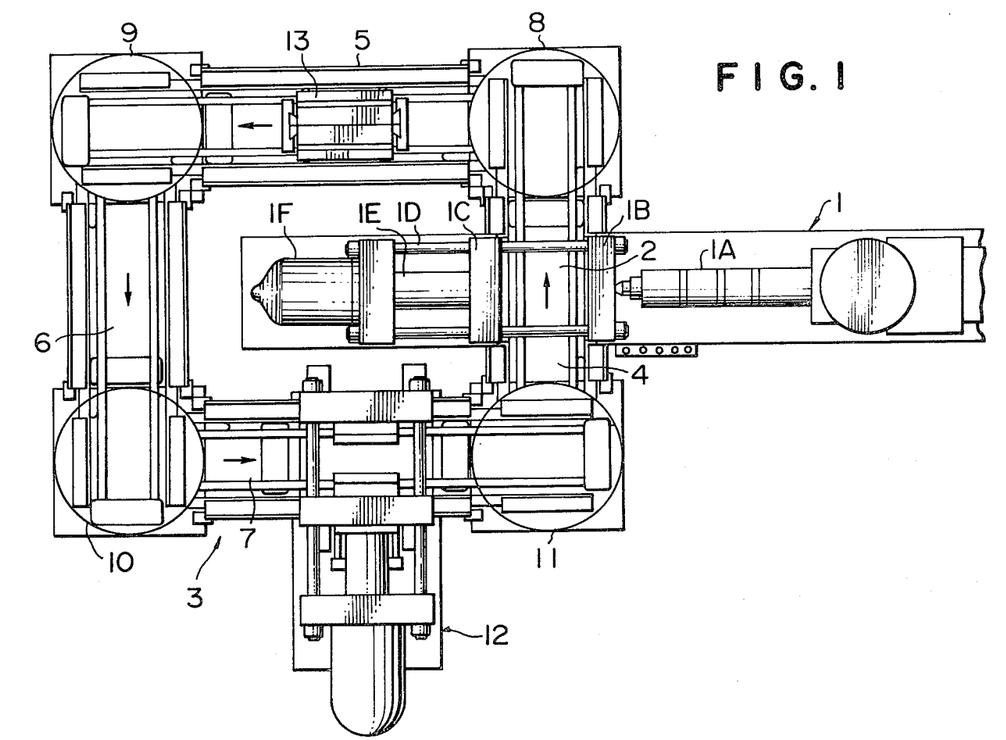
FIG. 1 is a top view of an injection molding apparatus provided with a mold conveying path.

As has been described earlier, when transporting the permanent molds 13 in the counterclockwise direction by using a mold conveying path of the rectangular pattern as shown by arrows in FIG. 1, the permanent molds 13 should preferably be turned through an angle of 90° in the clockwise direction, respectively. This is because, in case the permanent mold 13 is supported on rollers 17, the rotation of the rollers 17 is permitted for either of the mold conveying paths 4, 5, 6, and 7. In addition, the product removing means 12 should advantageously be located on the preceding mold conveying path 7 running at a right angle to the mold conveying path 4 for extending the cooling time. On the other hand, it is preferable for the direction to open the mold, to place the permanent mold in the direction at a right angle to the mold conveying path 7 from viewpoints of construction and arrangement of the product removing means 12. This may readily be achieved by placing the mating surfaces of the permanent mold halves 13a and 13b in the same direction as the lengthwise direction of the mold conveying path 7.

If there is simply used a mold conveying path having a rectangular pattern and no mold-direction turning means, in case the permanent mold 13 is moved by means of a pusher and the like, then the moving directions of the permanent mold with respect to the respective conveying paths will be different and the direction to open the mold (the direction to remove a product from the mold) will be parallel with the mold conveying path 7, thus resulting in unfavorable condition. More particularly, in case the direction to open the mold is parallel with the mold conveying path 7, then it is imperative that the product removing means 12 be arranged in parallel with the mold conveying path 7. However, this results in an impractical increase in space and the complication in construction.

In addition, in case the mold conveying path having a rectangular pattern is used and the permanent mold is so designed as to turn in the clockwise direction, then the turn table in a mold direction turning means should be so arranged as to turn the mold through an angle of 90° in the counterclockwise direction, thus achieving the same efficacy as that obtained in the previous case.

The mold-direction turning means which is essential for the mold conveying path having a rectangular pattern is that shown at 10 in FIG. 1, and thus the other mold-direction turning means may be omitted. What is essential is to open the permanent mold 13 in the direction which permits to open the mold. However, if the weight of a permanent mold 13 is considerable, then there should preferably be provided rollers 17 on the bottom surface of the permanent mold 13. In this sense, the embodiment shown is effectively used for this purpose.

Meanwhile, as shown in one of embodiments of the present invention, the position of the permanent mold 13 remains the same for either of the mold conveying paths, so that the widths of the mold conveying paths may be constant, and thus the manufactures of mold conveying paths and rails 16 are much facilitated.

As is apparent from the foregoing description of the injection apparatus of the present invention, the following advantages may be expected:

i. Since a molding cycle does not include a cooling cycle and thus a injection cycle itself serves as a molding cycle, the usage data of the injection molding machine is increased to several times as high as that obtained in the prior art.

ii. In the case of a product having a considerable mass which requires long cooling time, the apparatus according to the present invention presents an increased molding capability five to six times as much as that obtained according to the prior art injection molding system, thus requiring no man power nor many injection machines.

iii. In the case of molding in which the same material is used, products having different shapes may be molded at the same time. This provides flexibility to the process of production, contributing to an increase in the usage data of a molding machine.

iv. Since there is used a general type injection machine which is available in the market, investment cost remains low.

v. Since turn tables are provided at corners of the mold conveying paths in the injection machine of this type, the size of the apparatus may be minimized in the neighborhood of the injection machine, and in addition those turn tables are convenient for opening molds.

Although the present invention has been described with respect to specific details of certain embodiments thereof, it is not intended that such details be limitations upon the scope of the invention except in so far as set forth in the following claims.

I claim:

1. An injection molding apparatus having a permanent mold conveying path comprising
an injecting cylinder, a cylinder means for tightening a permanent mold, and an injection molding machine having an injection station between the injection cylinder and the cylinder means;
a mold conveying path of rectangular pattern having a starting point adjacent a side of the injection station and terminating at a terminal adjacent an opposite side of the injection station;
molded product removing means adjacent to the terminal of the mold conveying path and disposed at a right angle to the mold conveying path;
mold direction turning means located at respective corners of the mold conveying path for turning the permanent mold in a direction facilitating the aligning and opening of the permanent mold consisting of two halves divided along a vertical plane in the molded product removing means; and
means for conveying the permanent mold along the mold conveying path such that the portion of the permanent mold cooperating with the conveying means remains in the same plane with respect to the conveying path during conveyance along the entire mold conveying path.

2. An injection molding apparatus according to claim 1 wherein the mold direction turning means turn the permanent mold through an angle of 90° in the same direction at each of the respective corners.

* * * * *